(12) United States Patent
Lyles et al.

(10) Patent No.: US 9,889,784 B1
(45) Date of Patent: Feb. 13, 2018

(54) HAULING DEVICE

(71) Applicants: Michael Lyles, Terry, MS (US); Laura Hudson-Lyles, Terry, MS (US)

(72) Inventors: Michael Lyles, Terry, MS (US); Laura Hudson-Lyles, Terry, MS (US)

( * ) Notice: Subject to any disclaimer, the term of this patent is extended or adjusted under 35 U.S.C. 154(b) by 169 days.

(21) Appl. No.: 14/930,695

(22) Filed: Nov. 3, 2015

Related U.S. Application Data

(60) Provisional application No. 62/076,757, filed on Nov. 7, 2014.

(51) Int. Cl.
*B60P 1/16* (2006.01)
*B60P 1/64* (2006.01)
*B60D 1/00* (2006.01)

(52) U.S. Cl.
CPC .............. *B60P 1/16* (2013.01); *B60D 1/00* (2013.01); *B60P 1/64* (2013.01); *B60D 2001/008* (2013.01)

(58) Field of Classification Search
CPC .... B60P 1/04; B60P 1/16; B60P 1/165; B60P 1/28; B60P 1/283; B60P 1/286; B60P 1/64; B60P 1/6409; B60P 1/6418; B62B 1/18; B60D 1/00; B60D 2001/008
USPC .......................................... 298/2, 17 R, 22 R
See application file for complete search history.

(56) References Cited

U.S. PATENT DOCUMENTS

| | | | | |
|---|---|---|---|---|
| 1,538,052 A | * | 5/1925 | Mueller | B60P 1/6418 280/423.1 |
| 2,718,431 A | * | 9/1955 | Pietroroia | B60P 1/06 280/405.1 |
| 2,984,374 A | | 5/1961 | Herpich et al. | |
| 3,058,779 A | * | 10/1962 | Pietroroia | B60P 1/20 298/17.5 |
| 3,160,439 A | * | 12/1964 | Kazakowitz | B62B 1/24 298/17 B |
| 3,447,834 A | * | 6/1969 | Grosse-Rhode | B60P 1/283 298/22 R |
| 3,731,974 A | * | 5/1973 | Stafford, Jr. | B62D 63/062 188/67 |
| 4,872,728 A | * | 10/1989 | Adams | B60P 3/07 298/17 R |
| 5,137,366 A | * | 8/1992 | Hill | B28C 5/4272 192/69.82 |
| 6,527,494 B2 | * | 3/2003 | Hurlburt | B62D 63/061 298/17.5 |
| 7,188,857 B2 | | 3/2007 | Richard et al. | |

(Continued)

FOREIGN PATENT DOCUMENTS

JP 10001056 A * 1/1998 .............. B62B 1/18

OTHER PUBLICATIONS

Polar Sport Off-Road ATV Trailer—1200—lb. Capacity, 15 Cu. Ft., Model#8232. Product Listing [online]. Northern Tool + Equipment, 2014 [retrieved on Mar. 17, 2014]. Retrieved from the Internet: http://www.northerntool.com/shop/tools/product_200135124_200135124.

(Continued)

*Primary Examiner* — H Gutman
(74) *Attorney, Agent, or Firm* — Robert C. Montgomery; Montgomery Patent & Design

(57) ABSTRACT

A hauling device configured to retain debris in a main bucket having a frame and adapted to be towed by a motorized vehicle is further configured to enable hoisting and dumping the frame of the main bucket via a lifting mechanism. An auxiliary bucket is provided that has a frame detachably affixed and clear of the main bucket.

16 Claims, 5 Drawing Sheets

(56) References Cited

U.S. PATENT DOCUMENTS

| | | | | |
|---|---|---|---|---|
| 8,215,717 | B2* | 7/2012 | Stewart | B60P 1/12 |
| | | | | 298/11 |
| 9,248,850 | B1* | 2/2016 | Romas | B62B 1/24 |
| 2006/0006726 | A1* | 1/2006 | Garvey | B62B 1/24 |
| | | | | 298/2 |
| 2006/0097482 | A1 | 5/2006 | Cumbie | |
| 2009/0224509 | A1 | 9/2009 | Ragusa | |
| 2010/0320739 | A1 | 12/2010 | Kittrell | |
| 2011/0139038 | A1* | 6/2011 | Pipkorn | B62B 1/20 |
| | | | | 108/25 |
| 2012/0187657 | A1* | 7/2012 | Carroll | B62B 1/20 |
| | | | | 280/415.1 |
| 2013/0034422 | A1 | 2/2013 | Warburton | |
| 2015/0040948 | A1* | 2/2015 | Sickler | A47L 7/0004 |
| | | | | 134/21 |
| 2015/0102582 | A1* | 4/2015 | Delorme | B60P 3/10 |
| | | | | 280/414.1 |
| 2015/0203018 | A1* | 7/2015 | Dechant | B60P 1/16 |
| | | | | 280/30 |
| 2015/0291078 | A1* | 10/2015 | Carrillo, Jr. | B60P 3/426 |
| | | | | 296/100.02 |
| 2016/0009305 | A1* | 1/2016 | Milo | B62B 1/20 |
| | | | | 280/47.31 |
| 2016/0144757 | A1* | 5/2016 | Romas | B62B 1/18 |
| | | | | 298/2 |

OTHER PUBLICATIONS

"Dump Cart Dumps Completely Wheel Barrow". Digital Photo [online]. Tractorbynet.com, 2012 [Retrieved on Mar. 17, 2014]. Retrieved from the Internet: http://www.tractorbynet.com/forums/attachments/build-yourself/293657d1355986748-dump-cart-dumps-completely-wheelbarrow.jpg.

"ATV Trailer". Product Plans [online]. Forest Service Technology & Development Program, 2014 [Retrieved on Mar. 17, 2014]. Retrieved from the Internet: http://www.fhwa.dot.gov/environment/recreational_trails/publications/fs_publications/00232839/page13b.cfm.

* cited by examiner

HAULING DEVICE

RELATED APPLICATIONS

The present invention is a continuation of, was first described in, and claims the benefit of U.S. Provisional Application No. 62/076,757, filed Nov. 7, 2014, the entire disclosures of which are incorporated herein by reference.

FIELD OF THE INVENTION

The present invention relates generally to a hauling device adapted to be towed and manipulated.

BACKGROUND OF THE INVENTION

Maintenance of one's lawn, landscaping, and garden is a seemingly never-ending task. Depending upon the size of the yard/garden, there are a countless number of chores that require the attention of the owner. Mowing the lawn, raking, trimming, mulching, pulling weeds, planting, the list goes on and on.

One (1) popular tool used by many to aid in the growth and beauty of one's lawn and/or garden is the wheelbarrow. This tool allows for easy transport of leaves, grass clippings, yard material, and the like. However, the wheelbarrow requires a good deal of physical strength to move it, as half of the weight of the contents must be borne by the person moving the wheelbarrow. It also requires even more physical strength to lift the wheelbarrow to dump the contents. As a result, the requirement of physical strength makes it unsuitable for use by children, elderly, and those with diminished physical strength.

Accordingly, there exists a need for a means by which yard and garden tasks can be accomplished in a simple and easy manner without the above-mentioned difficulties associated with traditional wheelbarrow use. The use of the hauling device provides for all of the advantages of a wheelbarrow, but without the inherent disadvantage of lifting, balancing, and moving a conventional wheelbarrow.

SUMMARY OF THE INVENTION

The inventor has recognized the aforementioned lack in the art and observed that there is a need for a hauling device adapted to be towed and manipulated.

It is therefore an object of the invention to provide an apparatus first comprising a cart frame. The cart frame has a tongue, a hitch connector, a support plate, a first tube and a second tube. The first and second tubes each have a pivot aperture disposed in a distal end. The hitch connector is attached to an upper face distal end of the tongue. The support plate is attached to a distal end of the tongue opposite the hitch connector as well as to the cart frame first and second tubes. The cart frame is capable of being attached and towed by a vehicle.

The apparatus next comprises a tub frame. The tub frame has a rectangular, tubular metal structure comprising a pair of parallel lateral members, a first cross member, a second cross member and a third cross member. The pair of parallel lateral members are connected at each end by the first cross member and the third cross member respectively. The pair of parallel lateral members are connected by the second cross member at perpendicular points between the first cross member and the third cross member. On the underside of the second cross member is a plurality of clevis brackets with each having a clevis bracket aperture. The apparatus next comprises a tub which is either securely or removably attached to the tub frame which is capable of pivotally motioning the tub relative to the cart frame. The apparatus last comprises a hydraulic lifting mechanism.

The cart frame further comprises a "U"-shaped stand secured to an underside of the support plate with of a pair of stand pivots. Each pivot aperture is configured to accommodate insertion of a dump pivot pin when the pivot apertures are aligned with the clevis bracket apertures in the tub frame. The support plate has a central planar portion and down turned perpendicular flanges.

The tub frame further comprises at least two (2) wheels, an axle having a first and second end and a pair of tube handles. One (1) of the two (2) wheels are attached to the first end of the axle and one (1) of the two (2) wheels are attached to the second end of the axle. The axle is attached to the first lateral member and to the second lateral member. Each of the tube handles are joined to the tube frame by a handle pin extending outwardly.

The hydraulic lifting mechanism is mounted to an upper face of the side furthest from the hitch connector of the first and second tube. The hydraulic lifting mechanism further comprises a jack. The jack comprises a lift arm, a platen disposed upon the lift arm, a jack actuator and a dump valve. The dump valve in a closed position permits transfer of fluid into an internal cylinder through reciprocating motioning of the jack actuator. The internal cylinder is in mechanical communication with the platen via the lift arm. The platen is in mechanical communication with the bottom of the tub.

The tub further comprises a wheelbarrow tray having a sloped, planar bottom and flaring, encircling sidewalls formed in one piece defining a hollow interior. The sidewalls have a peripheral lip. The tub further comprises a cover removably attached to the sidewalls and the removable cover has a shape coextensive with the peripheral lip. There is an auxiliary basket attached to a portion of the cart frame with a plurality of basket brackets. The auxiliary basket further comprises a hollow rectangular or cubic prism.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
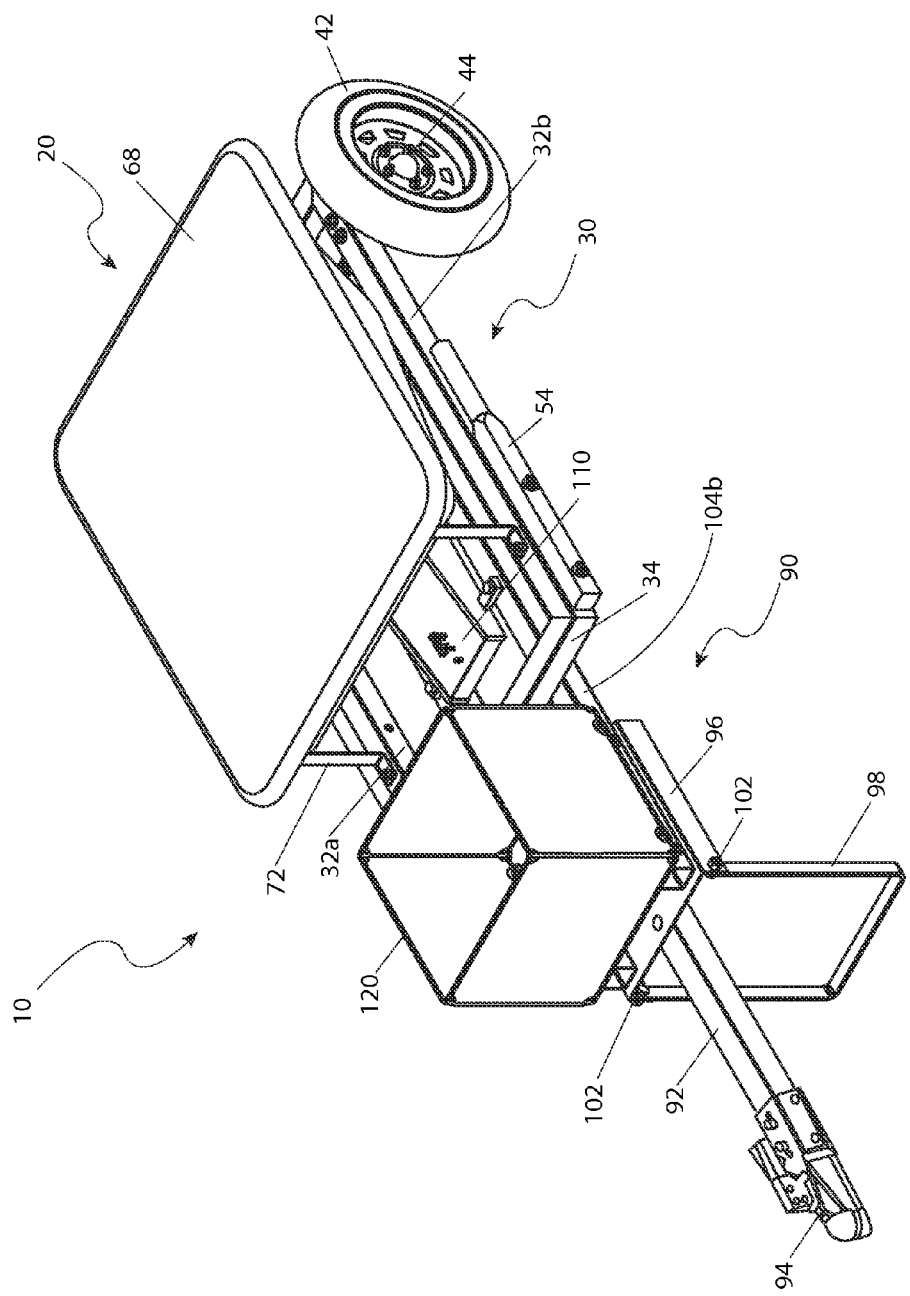
FIG. 1 is a view of a hauling device adapted to be towed 10 in accordance with the preferred embodiment of the present invention.

DESCRIPTIVE KEY 10 hauling device
20 tub 22 bottom
24 sidewall
26 interior
28 lip
30 tub frame
32a first lateral member
32b second lateral member
34 first cross member
36 second cross member
37 third cross member
38 tub fastener
40 axle
42 wheel
44 lug nut
46 U-bolt
48 threaded retainer
52 first tub handle
54 second tub handle
58 handle pin
62 pin aperture
64 flat washer
66 pin keeper
68 cover
72 tub first bracket
74 bracket fastener
82 clevis bracket
84 clevis bracket aperture
90 cart frame
92 tongue
94 hitch connector
96 support plate
98 stand
102 stand pivot
104a first tube
104b second tube
106 pivot aperture
108 dump pivot pin
109 pivot pin retainer
110 jack
111 lift arm
112 jack fastener
114 jack lever
115 valve
116 jack actuator
117 recess
118 platen
120 auxiliary basket
122 basket bracket
124 basket fastener

DETAILED DESCRIPTION OF THE
PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a hauling device adapted to be towed (herein referred to as the "apparatus") 10, which provides a device having an open tub 20 mounted on at least two (2) wheels 42 capable of conveying a variety of materials from one (1) location to another by attachment to any tractive means. The tub 20 is provided with a tub frame 30 which is pivotally attached to a cart frame 90 having provisions to tilt and dump the tub 20 with hydraulic assistance. The tub frame 30 with wheels 42 can be detached from the cart frame 90 to provide a user with increased maneuverability of the tub 20. The tub 20 is also provided with a removable cover 68. For the sake of this discussion, any reference made to the front of the apparatus 10 will indicate that end toward the direction of normal forward travel for the towing vehicle, while rear, or back, will indicate an opposite end. The right, or left, side will refer to that same side of an operator in a normally seated position on a towing vehicle.

Referring now to FIG. 1, an isometric view of the apparatus 10, according to the preferred embodiment of the present invention, is disclosed. The apparatus 10 includes a cart frame 90 with a tongue 92 having a hitch connector 94, and a removable tub frame 30 having an attached tub 20. The tub 20 is generally configured to be any of a variety of commercially available wheelbarrow trays having a sloped, planar bottom 22 and flaring, encircling sidewalls 24 formed in one (1) piece to define a hollow interior 26. The tub 20 may be composed of a metal, formed in a stamping process, having a protective coating to inhibit deterioration, or any other suitable material capable of supporting the intended loading. The sidewalls 24 will preferably have a peripheral lip 28 at an upper edge configured to be semi-circular in profile. The apparatus 10 is provided with a removable cover 68 which can be installed over the tub 20 to conceal and protect any cargo transported within the interior 26. The cover 68 is preferably composed of a waterproof nylon material and fitted specifically to conform to the lip 28 of the tub 20. It is understood that other materials may be utilized in the fabrication of the cover 68 without limiting the scope of the apparatus 10. The cover 68 is configured to have an elastic band (not shown) attached around the perimeter thereof, preferably by means of stitching, so as to gather the perimeter in the area under the lip 28 of the tub 20 so as to retain the cover 68.

The apparatus 10 includes an auxiliary basket 120 attached to a portion of the cart frame 90 by means of a plurality of basket brackets 122. Preferably, the mounting location of the auxiliary basket 120 is adjacent to the hitch connector 94 of the tongue 92. The auxiliary basket 120 is configured to be a hollow rectangular, or cubic, prism capable of holding various solid items selected to be retained and transported with the apparatus 10 in a compartment separate from the tub 20. These items may be gloves, hand tools, or similar items, selected by a user for their convenience. In a preferred embodiment, the auxiliary basket 120 would be configured to have a skeletal framework of cylindrical, metal rods and planar lattice, or mesh, panels on four (4) sides and a bottom suspended from the framework. Other configurations of the auxiliary basket 120 may be presented in alternate embodiments and should not be seen as a limiting factor in the scope of this apparatus 10. The basket brackets 122 are configured to be spring clips meant to grasp and retain parts of the cylindrical framework of the auxiliary basket 120. The basket brackets 122 are attached to and retained upon a front end of a first tube 104a and a second tube 104b by means of basket fasteners 124.

Figure 2:
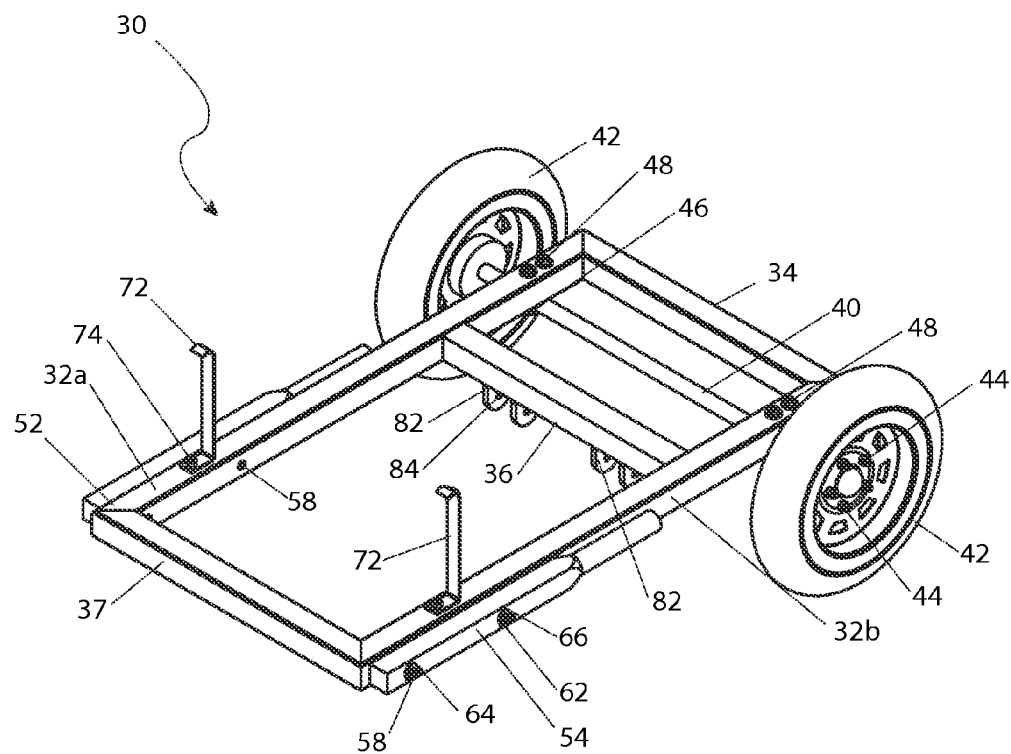
FIG. 2 is an isolated view of a tub frame 30 of the hauling device 10 in accordance with the preferred embodiment of the present invention.

Referring now to FIG. 2, an isolated view of a tub frame 30 of the apparatus 10, according to the preferred embodiment of the present invention, is disclosed. The tub frame 30 is preferably configured to be a rectangular, welded, tubular metal structure. A pair of parallel lateral members 32a, 32b is attached perpendicularly at either end of a first cross member 34 and a third cross member 37. For purposes of illustration only, the first cross member 34 is described as being in the rear of the apparatus 10 and the third cross member 37 is described as being in the front. The abutting joints of the lateral members 32a, 32b and the first cross members 34 and the third cross member 37 are mitered at appropriate intersecting angles to provide a smooth fit and a full penetration weld. At least one (1) second cross member 36 is positioned between the lateral members 32a, 32b and continuously welded, with appropriate bead, around the perimeter of each end to permanently secure the second cross member 36. The second cross member 36 spans the distance between the lateral members 32a, 32b and is preferably located adjacent to the first cross member 34. The tub frame 30 is provided with a protective coating, or plating, to inhibit corrosion.

The tub 20 is attached to the tub frame 30 and retained thereon preferable with a plurality of threaded tub fasteners 38 inserted from the interior 26 and secured on an underside of the second cross member 36. The tub 20 is additionally supported on the tub frame 30 by means of at least two (2) tub first brackets 72. Each first tub bracket 72 is attached to a respective lateral member 32a, 32b of the tub frame 30 by means of a, preferably threaded, bracket fastener inserted through apertures (not shown) in the respective lateral member 32a, 32b. The first tub brackets 72 are configured to project vertically from the lateral members 32a, 32b, being perpendicular thereto, and conform to fit under the lip 28 of the tub 20. It is understood that these first tub brackets 72 may be attached to the tub 20 by any means, such as welding, without limiting the scope of the intent of the apparatus 10.

Figure 4:
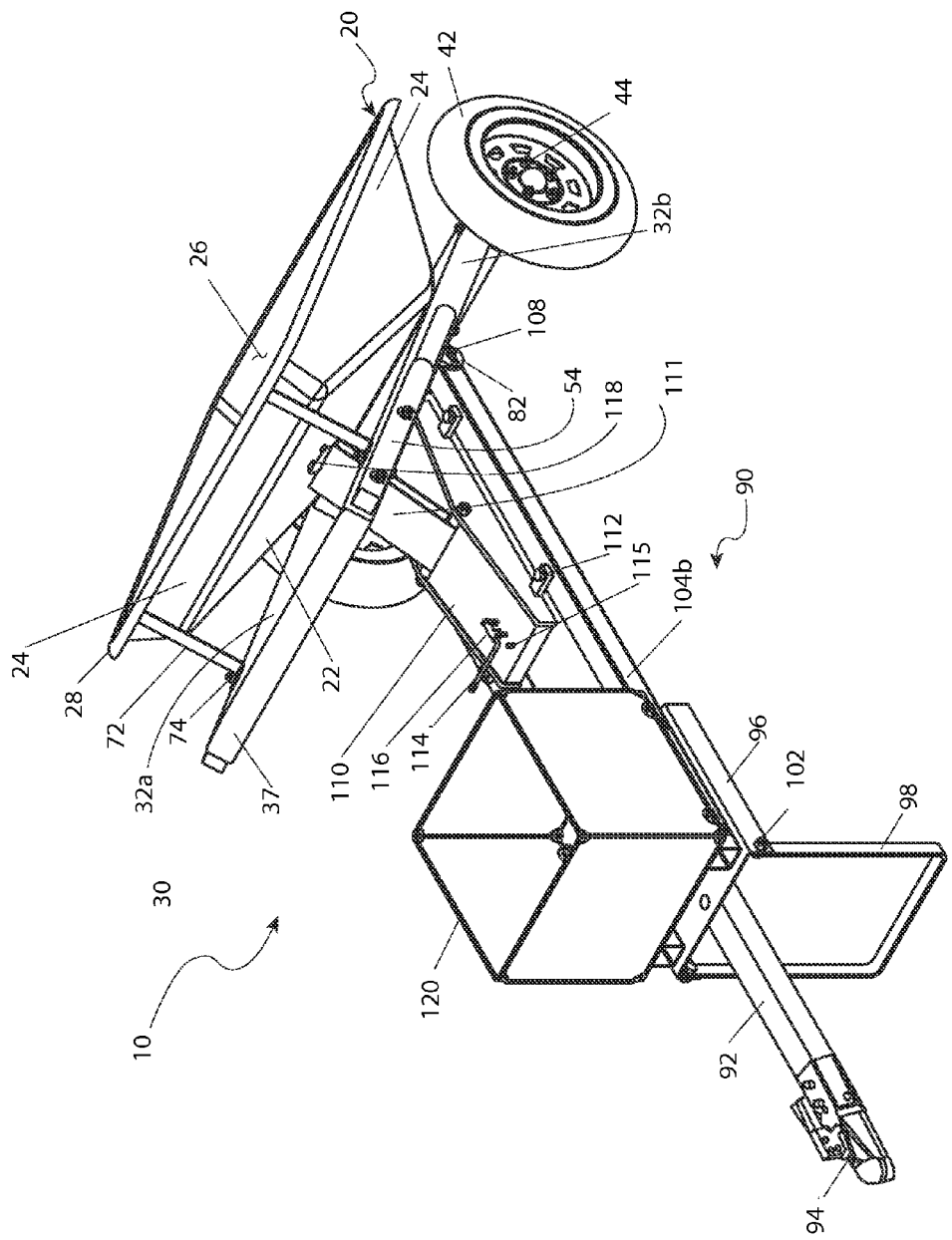
FIG. 4 is an isometric view of the hauling device 10, with a tub 20 in a raised, dumping position, in accordance with the preferred embodiment of the present invention; and, FIG. 5 is an isolated view of the hauling device 10, depicted with a tub frame 30 separated from a cart frame 90, in accordance with the preferred embodiment of the present invention.

Disposed upon an underside of the second cross member 36 is a plurality of clevis brackets 82. These clevis brackets 82 are configured to be flat plates, having a square-cut upper end and a generally rounded lower end, welded to a lower face of the second cross member 36. The clevis brackets 82 are each provided with a centrally located clevis bracket aperture 84 for the insertion of a dump pivot pin 108 through each pair of clevis brackets 82 as seen in FIG. 4. The exact purpose of the dump pivot pins 108 will be more fully explained in a discussion of a cart frame 90.

Attached to a rear portion of the tub frame 30 is an axle 40 with a pair of wheels 42. In a preferred embodiment the axle 40 is a cylindrical shaft mounted in such a way as to preclude rotation of the axle 40 by including rotatable hubs. The axle 40 is attached to the tub frame 30 in at least two (2) locations by means of U-bolts 46 encircling a portion of the circumference of the axle 40 and inserted into apertures (not shown) drilled through the lateral members 32a, 32b. The U-bolts 46 are secured to the lateral members 32a, 32b by means of threaded retainers 48 which clamp the axle 40 to the lateral members 32a, 32b. It is understood that other methods of fastening the axle 40 to the tub frame 30, such as adaptive flanges, may be utilized without limiting the scope of the apparatus 10. Other types of axles 40, such as a live axle with a rotating inner member, may be adapted to be attached to the tub frame 30 in an alternate embodiment. The wheels 42 are secured to the axle 40 by means of a plurality of lug nuts 44. The wheels 42 are preferably configured to be commercially available pneumatic tires mounted onto standard rims selected to be of an appropriate size and loading capacity to meet the requirements of the apparatus 10 and a user.

Figure 5:
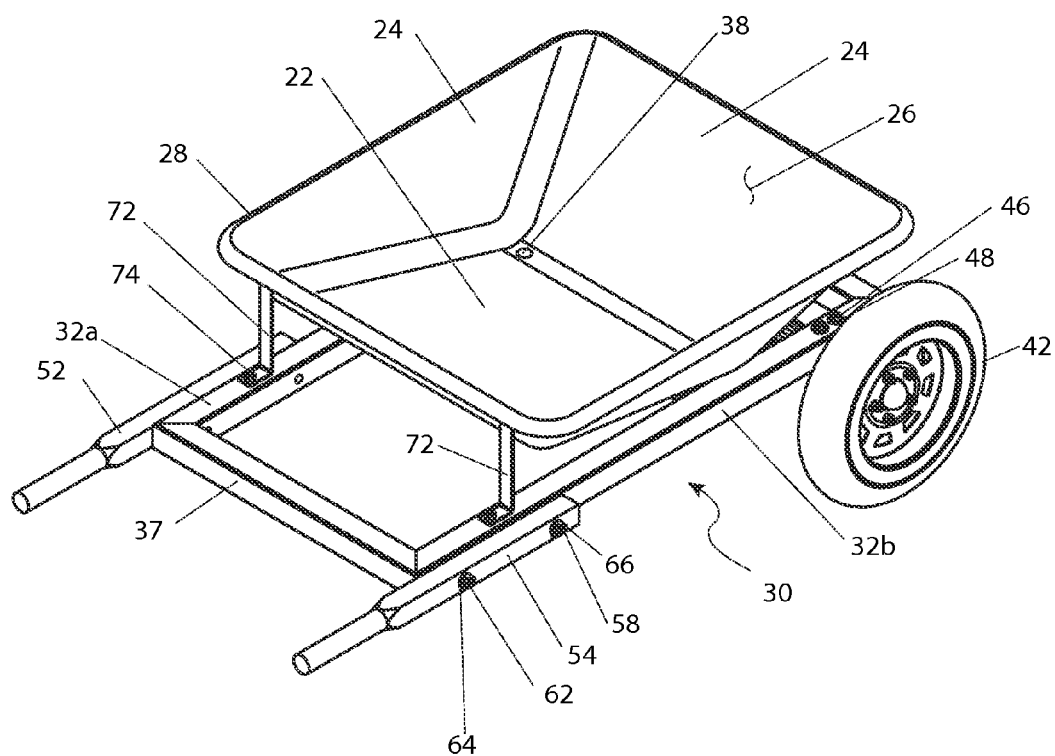

The tub frame 30 is provided with a first tub handle 52 and a second tub handle 54 by which the tub frame 30 may be maneuvered by a user after having detached the tub frame 30 from the cart frame 90. The tub handles 52, 54 are preferably composed of a hard wood, or other suitable material, and provided with handle apertures (not shown) of an appropriate size and configuration to accommodate the insertion of handle pins 58 for attachment to the sides of the tub frame 30. The tub handles 52, 54 are configured to be installed in a stored position as shown in FIGS. 1, 2, and 4 while not in use and rotated one hundred eighty degrees (180°) about the minimal axis between the outermost handle apertures (not shown) as illustrated in FIG. 5 for use in manually maneuvering the tub frame 30 and any cargo therein. The handle pins 58 are preferably cylindrical headed pins inserted into apertures (not shown) through the lateral members 32a, 32b. The handle pins 58 are provided with pin apertures 62 for the insertion of pin keepers 66. The pin keepers 66 may be any of a style of commercially available, quick attachment, spring type, cotter pins sized appropriately to be accommodated within the pin apertures 62. This preferred pin keeper 66 is typically inserted and removed without the use of additional hand tools. A flat washer 64 is preferably inserted over the handle pin 58 between the tub handle 52 or 54 and the pin keeper 66 in order to alleviate any overload of stress due to side loading. In use, the tub handles 52, 54 are moved from a storage position by first, removing the pin keepers 66 and the flat washers from the handle pins 58 and secondly, by removing the tub handles 52 or 54 from the handle pins 58. The method of installing and utilizing the tub handles 52, 54 to maneuver the tub frame 30 can be achieved by performing the following steps: rotating the first tub handle 52 end for end from the storage position; aligning the handle apertures with the handle pins 58 in a reverse spatial relationship from the previous condition; inserting the first tub handle 52 onto the handle pins 58 projecting from the apertures of the respective lateral member 32a, 32b on the appropriate side of the tub frame 30; reinserting the flat washers 64 and the pin keepers 66 in that order; repeating the steps for the second tub handle 54.

Figure 3:
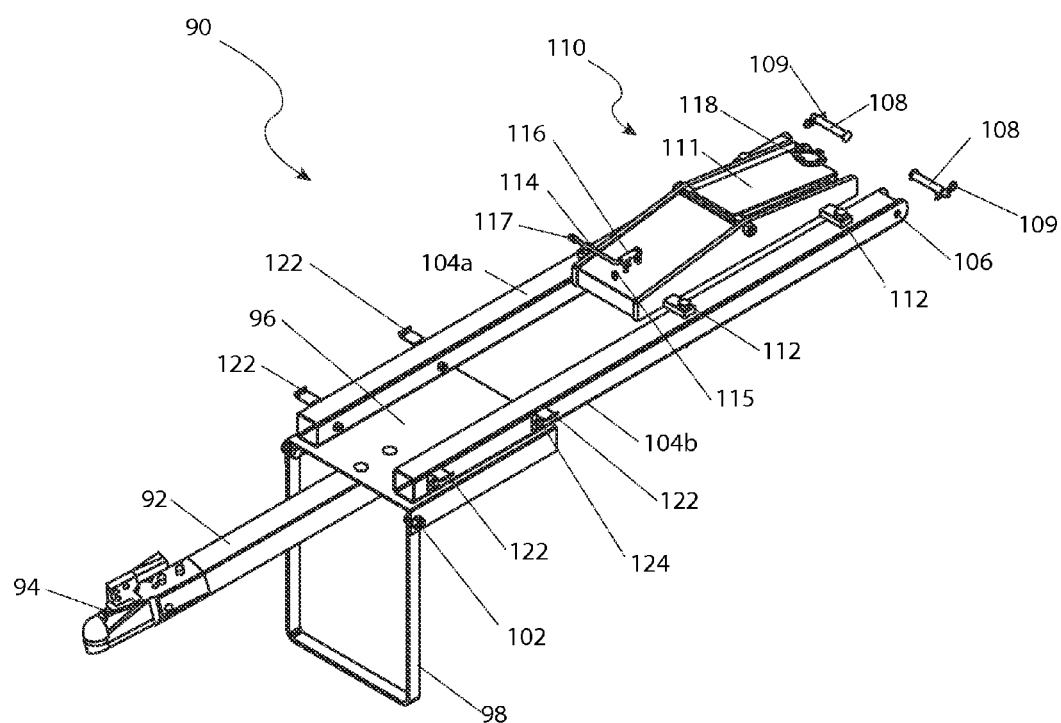
FIG. 3 is an isolated view of a cart frame 90 of the hauling device 10 in accordance with the preferred embodiment of the present invention.

Referring now to FIG. 3, an isolated view of the cart frame 90 of the apparatus 10, according to the preferred embodiment of the present invention, is disclosed. The cart frame 90 is preferably configured to be a bolted and/or welded framework of square metal tubes and a formed plate with a hydraulic jack 110 attached. A tongue 92 is a central, proximal member of the cart frame 90. The tongue 92 is preferably a square metal tube having a commercially available hitch connector 94 attached at a front end thereof. It should be understood that the utilization of a particular hitch connector 94 does not preclude the use of any other style, or method, of attachment to a motive vehicle in any other embodiment and should not be seen as a limiting factor to the scope or intent of the apparatus 10. The length of the tongue 92 should be dictated by the desired distance between any other part of the apparatus 10 and any part of the tow vehicle in the shortest turn radius which the vehicle can accomplish. A support plate 96 is attached to a distal end of the tongue 92 preferably by means of threaded fasteners of some type inserted into appropriate apertures. The support plate 96 is a formed metal plate having a central planar portion and down turned perpendicular flanges yielding a section profile of a shallow, inverted "U". Attached to a front end of the downturned flanges is a "U"-shaped stand 98. The stand 98 is configured to be a metal strap formed into the appropriate shape and attached to the support plate 96 by means of a stand pivot 102 on either side of the support plate 96. The stand pivots 102 are preferably headed and threaded fasteners with retaining nuts tightened to a sufficient torque to disallow any relative motion such that the stand 98 could be rotated to any selected position between perpendicular to the support plate 96 and parallel thereto. The purpose of the stand 98 is to support the tongue 92 and any attached hitch connector 94 in an elevated position when the apparatus 10 is not connected to a tow vehicle with the stand 98 oriented in a perpendicular position to the tongue 92.

Attached to an upper face of the support plate 96, preferably by welding, are a first tube 104*a* and a second tube 104*b*. The first tube 104*a* and the second tube 104*b* are preferably square metal tubes which constitute the central support structure for the tub frame 30. The first tube 104*a* and the second tube 104*b* are configured to be rounded at a distal end with each having a pivot aperture 106 disposed therein. The pivot apertures 106 are to accommodate the insertion of a dump pivot pin 108 into each of the first tube 104*a* and the second tube 104*b* when the pivot apertures 106 are aligned with the clevis bracket apertures 84 in the tub frame 30 as depicted in FIG. 5. The dump pivot pin 104 is configured to be a headed metal pin having an aperture (not shown) for the insertion of a pivot pin retainer 109. The pivot pin retainers 109 may be any of a style of commercially available, quick attachment, spring type, cotter pins sized appropriately to be accommodated within the apertures (not shown) of the dump pivot pins 108.

A commercially available hydraulic jack 110 is adapted to be mounted to an upper face of each of the first tube 104*a* and the second tube 104*b*. The jack 110 is preferably attached to the tubes 104*a*, 104*b* by means of a plurality of threaded jack fasteners 112 inserted through apertures (not shown) drilled into the tubes 104*a*, 104*b* and secured with threaded retainers (not shown). A lift arm 111 is pivotally attached to the frame of the jack 110 and functionally controlled by a jack actuator 116. When the apparatus 10 is fully assembled, as depicted in FIG. 1, a platen 118 of the lift arm 111 is configured to be in contact with the exterior of the bottom 22 of the tub 20. A user may place selected material into the interior 26 of the tub 20 in this configuration. The preferred jack 110 is provided with a rotationally activated dump valve 115 and the reciprocating jack actuator 116. In a closed position the valve 115 enables a user to pump fluid into an internal cylinder (not shown) by manipulating the jack actuator 116 with a jack lever 114. The internal cylinder is in mechanical connection to the platen 118, via the lift arm 111, which is generally configured to be a disk-shaped plate. As fluid pressure is increased within the hydraulic cylinder the lift arm 111 and the platen 118 will be raised thereby lifting the bottom 22 of the tub 20 and rotating the tub frame 30 about the dump pivot pins 118, now inserted between the tubes 104*a*, 104*b* and the clevis brackets 82 and allowing the contents of the tub 20 to spill out as shown in FIG. 4. In an open position, the valve 115 will permit fluid to be exhausted from the cylinder allowing the lift arm 111 and the platen 118 to descend to the original position returning the tub 20 to a more horizontal position as depicted in FIG. 1. The jack lever 114 supplied with the apparatus 10 is configured to be a metal rod having an outside diameter capable of being inserted into the jack actuator 116. The jack lever 114 has an offset bend near a first end to provide a clearance with certain parts of the tub frame 30 while operating the jack actuator 116. A second end of the jack lever 114 is provided with a recess 117 into which the valve 115 can be inserted to provide the necessary leverage for rotationally turning. These are all, more or less, standard features of commercially available jacks 110 and should be familiar to persons skilled in the art.

Referring now to FIG. 5, an isolated view of the apparatus 10, depicted with the tub frame 30 separated from the cart frame 90, according to the preferred embodiment of the present invention, is disclosed. A user may, at their discretion, remove the dump pivot pins 108 from the clevis brackets 82 of the tub frame 30 and the apertures at the distal ends of the first tube 104*a* and the second tube 104*b* as illustrated in FIG. 3. The dump pivot pins 108 constitute the only physical connection between the tub frame 30 and the cart frame 90.

The preferred embodiment of the present invention can be utilized by an enabled individual in a simple and straightforward manner with little or no training After initial purchase or acquisition of the apparatus 10, it would be installed as indicated in FIG. 1. The method of installing and utilizing the apparatus 10 may be achieved by performing the following steps: acquiring a model of the apparatus 10 having a desired size to meet the needs of the user; installing the hitch connector 94 into the hitch provisions of the towing vehicle; placing the desired items or material into the interior 22 of the tub 20; placing the desired items into the auxiliary basket 120 at the discretion of the user; towing the apparatus 10 to the desired location; and utilizing the items in the auxiliary basket 120 or handling the materials within the tub 20 in the desired manner.

The tub frame 30 may be detached from the cart frame 90 to enhance the maneuverability of the tub frame 30 in the manner previously discussed. The cover 68 may be installed onto the tub 30 at the discretion of the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hauling apparatus comprising:
   a cart frame comprising;
      a first tube;
      a second tube;
      a tongue;
      a hitch connector attached to an upper face of a first distal end of said tongue; and,
      a support plate attached to a second distal end of said tongue opposite said first distal end and to said cart frame first and second tubes;
      wherein said first and second tubes each have a pivot aperture disposed in a distal end;
   a tub frame comprising:
      a pair of parallel lateral members;
      a first cross member;
      a second cross member; and,
      a third cross member;
      wherein said pair of parallel lateral members are connected at each end by said first cross member and said third cross member respectively;

wherein said pair of parallel lateral members are connected by said second cross member at perpendicular points between said first cross member and said third cross member; and,
whereupon an underside of said second cross member is a plurality of clevis brackets, each having a clevis bracket aperture;
a tub affixed to said tub frame; and,
a hydraulic lifting mechanism, mounted to an upper face of the side furthest from said hitch connector of said first and second tube, and pivotally motioning said tub relative to said cart frame further comprising:
a lift arm;
a platen disposed upon said lift arm and in mechanical communication with the bottom of said tub;
a jack actuator; and,
a dump valve;
wherein said dump valve, when in a closed position, permits transfer of fluid into an internal cylinder, which is in mechanical communication with said platen via said lift arm, through reciprocating motioning of said jack actuator when in a closed position; and,
wherein said cart frame is capable of being attached and towed by a vehicle.

2. The apparatus of claim 1, wherein said cart frame further comprises a "U" shaped stand secured to an underside of said support plate with of a pair of stand pivots;
wherein each pivot aperture is configured to accommodate insertion of a dump pivot pin when said pivot apertures are aligned with said clevis bracket apertures in said tub frame.

3. The apparatus of claim 2, wherein said support plate has a central planar portion and down turned perpendicular flanges.

4. The apparatus of claim 1, wherein said tub frame further comprises:
at least two wheels;
an axle having a first and second end; and,
a pair of tube handles;
wherein one of said two wheels are attached to said first end of said axle and one of said two wheels are attached to said second end of said axle;
wherein said axle is attached to said first lateral member and to said second lateral member; and,
wherein each of said tube handles are joined to said tube frame by a handle pin extending outwardly.

5. The apparatus of claim 1, wherein said tub further comprises a wheelbarrow tray having a sloped, planar bottom and flaring, encircling sidewalls formed in one piece defining a hollow interior;
wherein said sidewalls have a peripheral lip.

6. The apparatus of claim 5, wherein said tub further comprises a cover removably attached to said sidewalls;
wherein said cover has a shape coextensive with said peripheral lip.

7. The apparatus of claim 1, further comprising an auxiliary basket attached to a portion of said cart frame with a plurality of basket brackets.

8. The apparatus of claim 7, wherein said auxiliary basket further comprises a hollow rectangular or cubic prism.

9. A hauling apparatus comprising:
a cart frame comprising;
a first tube;
a second tube;
a tongue;
a hitch connector attached to an upper face of a first distal end of said tongue; and,
a support plate attached to a second distal end of said tongue opposite said first distal end and to said cart frame first and second tubes;
wherein said first and second tubes each have a pivot aperture disposed in a distal end;
a tub frame comprising:
a pair of parallel lateral members;
a first cross member;
a second cross member; and,
a third cross member;
wherein said pair of parallel lateral members are connected at each end by said first cross member and said third cross member respectively;
wherein said pair of parallel lateral members are connected by said second cross member at perpendicular points between said first cross member and said third cross member; and,
whereupon an underside of said second cross member is a plurality of clevis brackets, each having a clevis bracket aperture;
a tub removably attached to said tub frame; and,
a hydraulic lifting mechanism, mounted to an upper face of the side furthest from said hitch connector of said first and second tube, and pivotally motioning said tub relative to said cart frame further comprising:
a lift arm;
a platen disposed upon said lift arm and in mechanical communication with the bottom of said tub;
a jack actuator; and,
a dump valve;
wherein said dump valve, when in a closed position, permits transfer of fluid into an internal cylinder, which is in mechanical communication with said platen via said lift arm, through reciprocating motioning of said jack actuator when in a closed position; and,
wherein said cart frame is capable of being attached and towed by a vehicle.

10. The apparatus of claim 9, wherein said cart frame further comprises a "U" shaped stand secured to an underside of said support plate with of a pair of stand pivots;
wherein each pivot aperture is configured to accommodate insertion of a dump pivot pin when said pivot apertures are aligned with said clevis bracket apertures in said tub frame.

11. The apparatus of claim 10, wherein said support plate has a central planar portion and down turned perpendicular flanges.

12. The apparatus of claim 9, wherein said tub frame further comprises:
at least two wheels;
an axle having a first and second end; and,
a pair of tube handles;
wherein one of said two wheels are attached to said first end of said axle and one of said two wheels are attached to said second end of said axle;
wherein said axle is attached to said first lateral member and to said second lateral member; and,
wherein each of said tube handles are joined to said tube frame by a handle pin extending outwardly.

13. The apparatus of claim 9, wherein said tub further comprises a wheelbarrow tray having a sloped, planar bottom and flaring, encircling sidewalls formed in one piece defining a hollow interior;
wherein said sidewalls have a peripheral lip.

14. The apparatus of claim 13, wherein said tub further comprises a cover removably attached to said sidewalls;

wherein said cover has a shape coextensive with said peripheral lip.

15. The apparatus of claim 9, further comprising an auxiliary basket attached to a portion of said cart frame with a plurality of basket brackets.

16. The apparatus of claim 15, wherein said auxiliary basket further comprises a hollow rectangular or cubic prism.

* * * * *